April 1, 1958   J. E. KAISER   2,828,536
STEP CHUCK
Filed Jan. 18, 1956
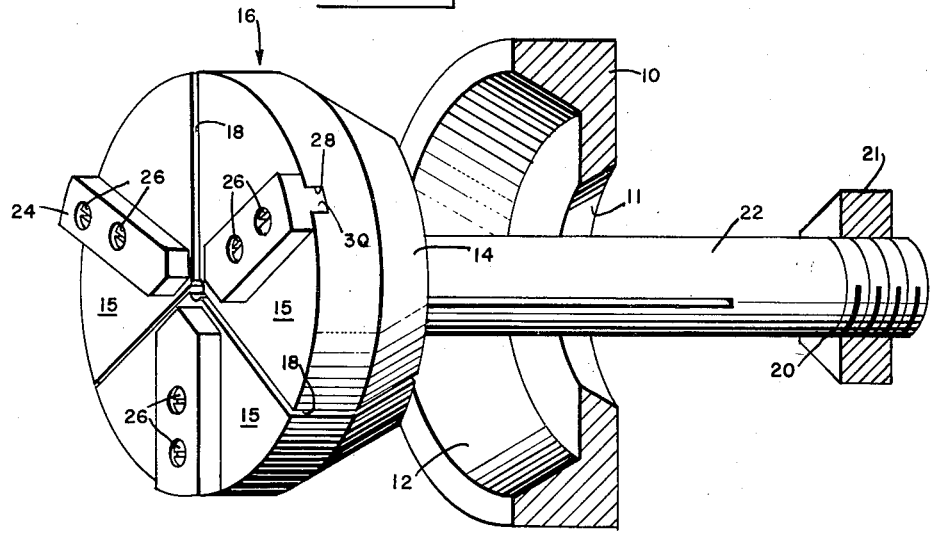
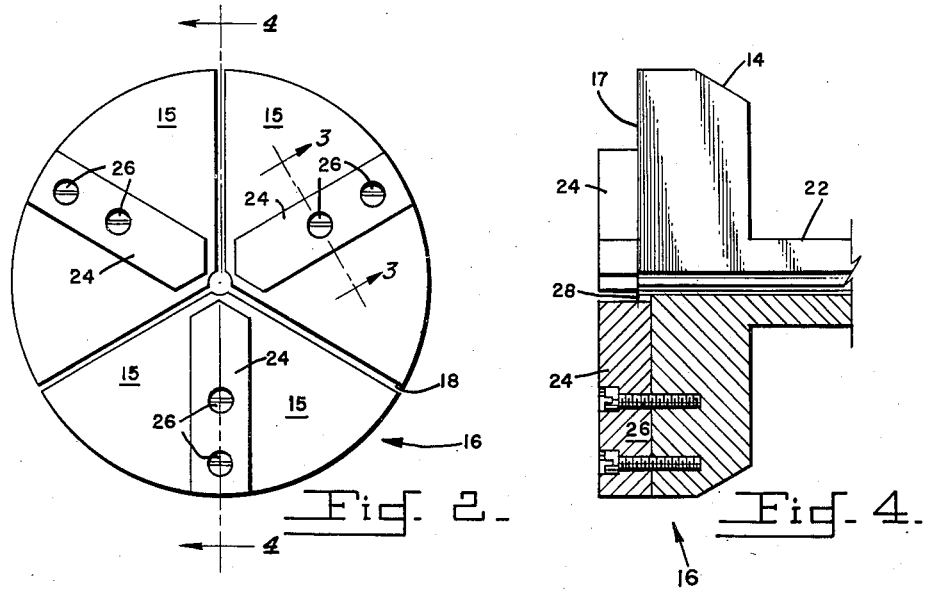
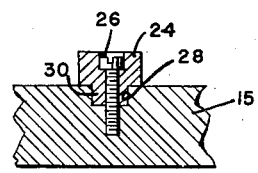
INVENTOR
John E. Kaiser
BY
W. E. Thibodeau, A. W. Dew and J. P. Edgerton
ATTORNEYS 2,828,536

STEP CHUCK

John E. Kaiser, Hillcrest Estates, Md.

Application January 18, 1956, Serial No. 560,044

2 Claims. (Cl. 29—406)

(Granted under Title 35, U. S. Code (1952), sec. 266)

The invention described herein may be manufactured and used by or for the Government for governmental purposes without the payment to me of any royalty thereon.

This invention relates to machine tools and more particularly to collet chucks of the step type for holding work to be rotated.

A problem exists in attempting to mount a piece of circular work to turn precisely about its center. Although there are numerous chucks that quickly and approximately center the work, to obtain accuracy it is necessary to resort to expensive and delicate precision chucks. I have solved this problem by providing a simple chuck that is mounted on a lathe. Replaceable jaws are then bored to fit the work. As the boring of the jaws is done on the lathe, the jaws are necessarily exact with relation to the center of rotation, and consequently so will any work placed therein be exactly centered.

Because the size adaptability is very slight, for accuracy, therefore, it is necessary to machine the chuck jaws for each job. Because I provide replaceable jaws, the great expense of boring away the chuck itself is avoided.

An object of this invention is to provide a chuck to turn a piece of work precisely about its center.

Further objects are to achieve the above with a device that is sturdy, simple, and reliable, yet cheap and easy to manufacture.

The specific nature of the invention as well as other objects, uses and advantages thereof will clearly appear from the following description and from the accompanying drawings, in which:

Fig. 1 is a perspective view, partially broken away, of a chuck of this invention.

Fig. 2 is a front elevation of the jaw-holders and jaws.

Fig. 3 is a sectional view of a jaw taken on lines 3—3 of Fig. 2.

Fig. 4 is a sectional view taken along lines 4—4 of Fig. 2.

The chuck shown in the figures comprises a collet 10 which fits at 11 on a tapered rotating element (not shown) of a lathe. Conic surface 12 of the collet interacts with mating surface 14 of the three sections 15 of jaw-holder 16. The jaw-holder is a flat cylinder or disc with a flat face 17. These three sections 15 are separated by three radial slots 18 so that when the jaw-holder 16 is moved by draw nut 21 on threads 20 of spindle 22 the three sections 15 of jaw-holder 16 move together. Three jaws 24 are attached to a flat face 17 of jaw-holder 16 by screws 26 extending through the jaw into the holder. The sections 15 are grooved at 28 and the jaws have tongues 30 in these grooves for additional rigidity.

The jaws 24 are preferably made of a soft metal because it is easy to machine, cheap, and not damaging to the work. It is possible to make them of soft metal because they are not a working part of the chuck and they will have a relatively short life and not be subjected to long wear.

In operation the chuck is mounted on a lathe and the jaws 24 are bored to the approximate diameter of the work. The draw nut 21 is then loosened and the work is placed in the bored cavity and the draw nut 21 tightened. Thus the work will be accurately placed relative to the center of rotation.

On the next job it is only necessary to rebore the jaws 24 to the work diameter if the work is larger. The jaws may be used for several successively larger jobs before they are discarded. However, as their cost is small it would be economically feasible to use them only once or twice before discarding them.

It will be apparent that the embodiment shown is only exemplary and that various modifications can be made in construction material and arrangement within the scope of the invention as defined in the appended claims.

I claim:

1. An improved method of centering a circular piece of work for rotation precisely about the center of the workpiece, comprising the following steps: mounting a plurality of soft metal jaws radially on the circular face of a collet chuck in such a manner that the jaw extremities nearest the center of the collet face define an opening smaller than that of the workpiece; rotating the collet chuck and jaws; boring portions of said jaw extremities nearest the center of said circular face so that a circular cavity is formed by said jaw extremities, said cavity having a diameter approximately that of the workpiece; and thereafter inserting the workpiece into the cavity.

2. An improved method of centering a circular piece of work for rotation precisely about the center of the workpiece, comprising the following steps: mounting a plurality of soft metal jaws on the circular face of a collet chuck; moving the jaws radially inwardly towards the center of the circular face of the collet chuck until the opening defined between the tips of the jaw extremities nearest the center of the circular face is smaller in diameter than said workpiece; rotating the collet chuck and jaws; boring portions of said jaw extremities nearest the center of said circular face to produce a circular cavity having a diameter approximately that of the workpiece; adjusting the jaws to permit the insertion of the workpiece into the thusly formed cavity; and then tightening the collet chuck so as to bring the jaws into intimate contact with the workpiece.

References Cited in the file of this patent

UNITED STATES PATENTS

| 926,761 | Oliver | July 6, 1909 |
| 978,055 | Owens | Dec. 6, 1910 |
| 1,898,264 | Proefke | Feb. 21, 1933 |
| 2,502,216 | Grivna | Mar. 28, 1950 |
| 2,598,165 | Harvey | May 27, 1952 |

FOREIGN PATENTS

| 482,101 | Canada | Apr. 1, 1952 |